M. K. GOLDEN & W. H. KENDALL.
POWER TRANSMISSION MECHANISM.
APPLICATION FILED SEPT. 8, 1909.

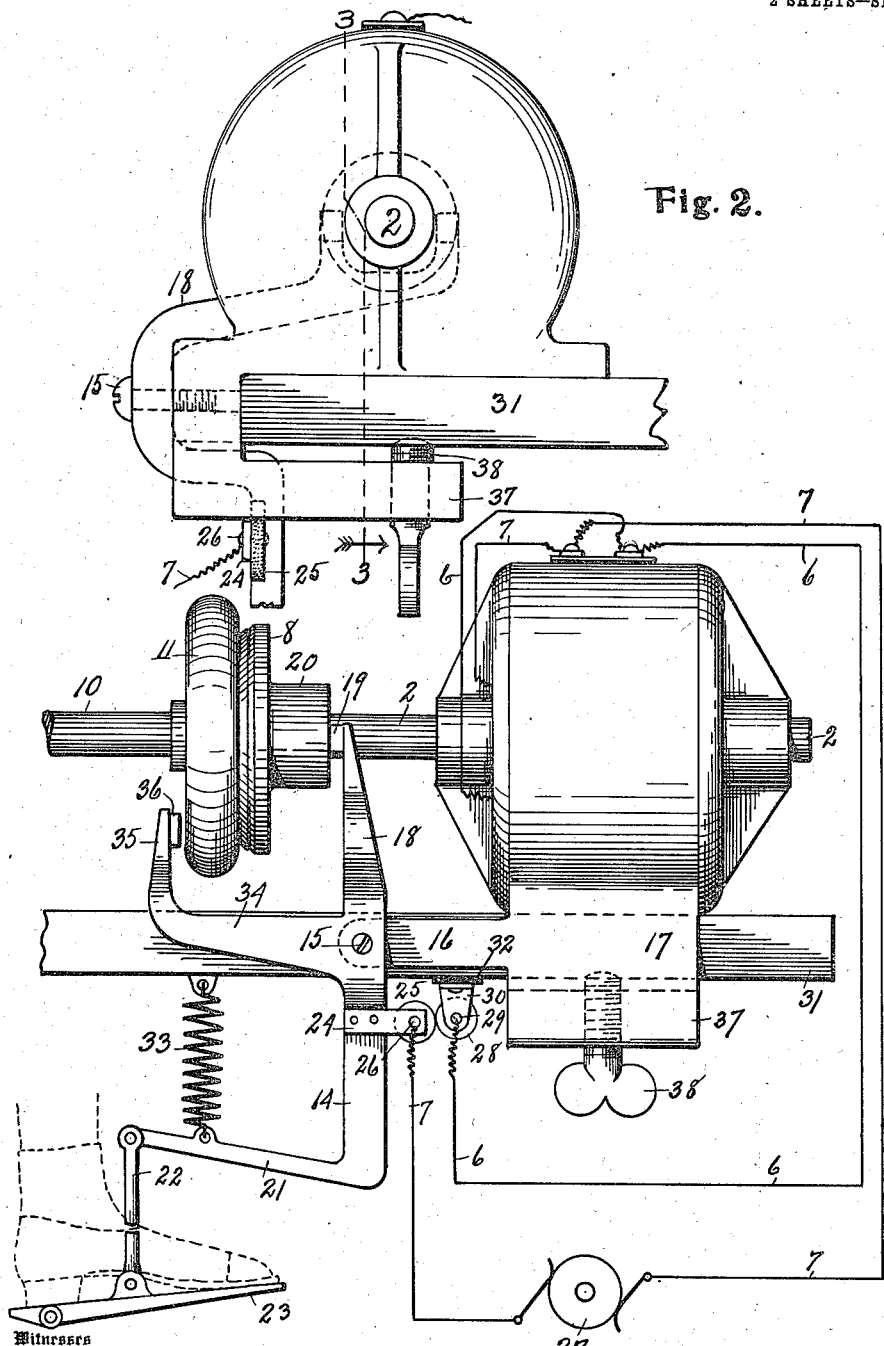

963,138.

Patented July 5, 1910.
2 SHEETS—SHEET 2.

Witnesses
O. B. Baenziger.
J. G. Howlett.

Inventors
Maximilian K. Golden
William H. Kendall.

By T. A. Wheeler & Co.
Attorneys

UNITED STATES PATENT OFFICE.

MAXIMILIAN K. GOLDEN AND WILLIAM H. KENDALL, OF DETROIT, MICHIGAN, ASSIGNORS TO CROWN HAT MANFG. CO., OF DETROIT, MICHIGAN.

POWER-TRANSMISSION MECHANISM.

963,138.

Specification of Letters Patent. Patented July 5, 1910.

Application filed September 8, 1909. Serial No. 516,754.

*To all whom it may concern:*

Be it known that we, MAXIMILIAN K. GOLDEN and WILLIAM H. KENDALL, citizens of the United States, residing at Detroit, in the county of Wayne, State of Michigan, have invented certain new and useful Improvements in Power-Transmission Mechanism; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to mechanism for transmitting and controlling power, and consists in the construction and arrangement of parts hereinafter more fully set forth and pointed out particularly in the claims.

The objects of the invention are to provide for detachably mounting a motor, preferably of the electric type and connecting said motor directly to the member to be driven in alinement with the axis of the motor shaft to obviate the use of belts or gearing in transmitting power from the motor to the driven member; to regulate the speed of the driven member, and provide a brake therefor automatically actuatable upon disconnecting the driving and driven members, and to provide for cutting off the current from the motor by the operation of disconnecting said member.

A further object is to provide for closing the switch or contacts in the motor circuit by the same operation which connects the driving member on the motor shaft with the driven member.

A further object is to provide for adjusting the motor and its parts with respect to the driven member so as to properly space the driving member on the motor shaft from the driven member.

The above objects are attained by the mechanism illustrated in the accompanying drawings, in which:—

Figure 4:
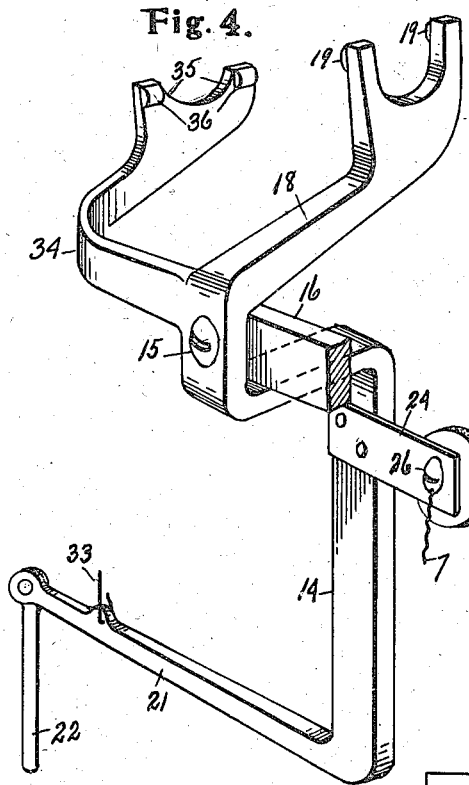
Figure 5:
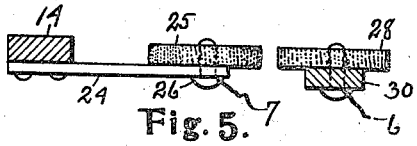
Figure 6:
Figure 7:
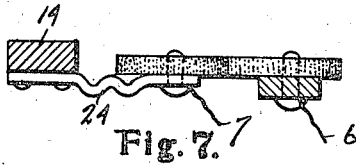
Figure 3:
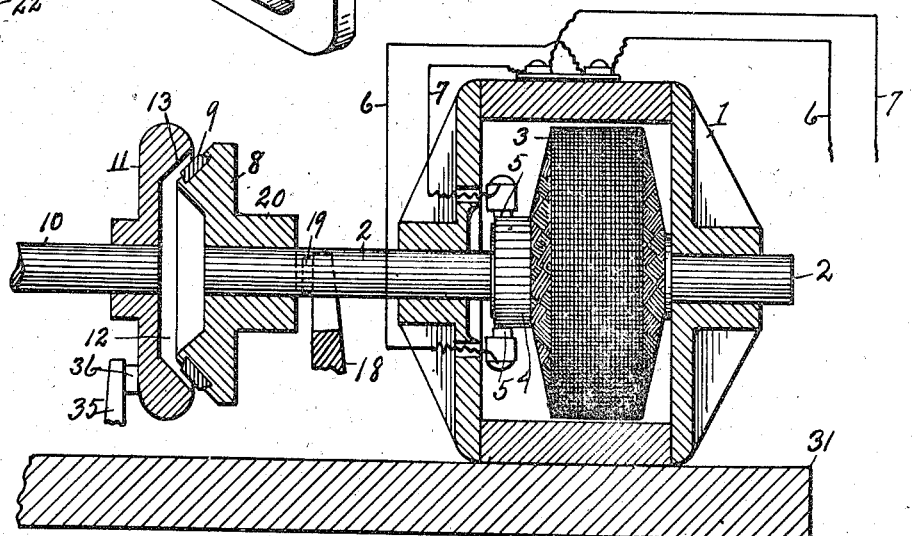

Figure 1 is an elevation showing one embodiment of our invention, there being in connection with the elevation of the mechanical parts, a diagrammatical view of the motor circuit. Fig. 2 is an end elevation of Fig. 1, showing the manner of adjustably mounting the motor and its connected parts on a table or other suitable support. Fig. 3 is a central longitudinal section as on line 3—3 of Fig. 2, the armature and its shaft appearing in elevation. Fig. 4 is an enlarged perspective view of the controlling lever adapted to be connected with a pedal and which controls the power-transmitting mechanism, as hereinafter explained. Fig. 5 is an enlarged fragmentary view, partly in section, of the switch or circuit-opening and closing contact disks in the motor circuit, showing said parts in their normal position with the circuit open. Fig. 6 is a similar view showing the contact disks brought together to close the circuit. Fig. 7 is a like view showing the flexibility in the connection between one of said disks and the controlling lever which enables said lever to be moved still farther after said disks shall have been brought together for the purpose of moving the driving member into contact with the member to be driven.

This mechanism for transmitting and controlling power, is intended primarily for driving sewing machines, and other small machines of a similar character but may be employed in transmitting power wherever it is found applicable.

Referring to the characters of reference 1 designates the case of the motor in the ends of which is suitably journaled the armature shaft 2, provision being made for a longitudinal movement of said shaft in its bearings. Mounted upon said shaft within the case of the motor is an armature 3 having the usual commutator 4 and brushes 5 with which the circuit wires 6 and 7 are connected, respectively.

Fixed to the outer end of the motor shaft is a beveled friction wheel 8 having set into the beveled face thereof a friction ring 9 of leather or other suitable material. In illustrating the application of our invention, we have shown it in connection with a driven shaft 10 which may be employed to operate a sewing machine, or for any other purpose desired. Secured to the end of the shaft 10 is a friction wheel 11 having a recess 12 therein concentric with the axis of the shaft 10 provided with a beveled wall 13 to coincide with the beveled face of the friction wheel 8. The shafts 2 and 10 are in axial alinement and the parts are so positioned as to cause the friction faces of the wheels 8 and 11 to lie in close relation to each other but free from frictional contact. The shaft 10 is held against longitudinal movement in its bearings while the motor shaft 2 as before explained is movable longitudinally as well as rotatable. While the shaft of the motor is turning, if it be moved longitudinally to carry the friction ring of the wheel 8 against the beveled wall of the recess in the wheel 11, said latter wheel will be turned and the shaft 10 revolved.

Provision is made for moving the motor shaft longitudinally to carry the friction ring on the wheel 8 into engagement with the beveled wall of the recess in the wheel 11, through the medium of the controlling lever 14, which is fulcrumed at 15 to an extension 16 on the base 17 of the motor case. The upper end of said lever above its point of fulcrum comprises an inwardly and upwardly extending arm 18 forked at its upper end to straddle the shaft 2 and carrying at the ends of the fork sides blocks 19 of suitable antifriction material adapted to bear against the hub 20 of the wheel 8. To the lower end of the lever 14 is connected a laterally extending arm 21 pivotally coupled at its free end to the upper end of the rod 22, the lower end of said rod being pivoted to a pedal 23, as shown in Fig. 1. A depression of the pedal 23 will swing the lever 14 on its fulcrum and carry the antifriction blocks 19 at the outer end thereof forcibly against the hub of the wheel 8, thereby sliding said wheel and its shaft 2 longitudinally to carry the friction ring 9 on said wheel into frictional engagement with the wheel 11, thereby turning the wheel 11 and transmitting power to the shaft 10, it being assumed that during said operation, shaft 2 is being rotated to turn the wheel 8.

To provide for closing the motor circuit concurrently with the operation of the lever 14 which carries the wheel 8 on shaft 2 into frictional engagement with the wheel 11 on shaft 10 to directly couple said shafts for the purpose of transmitting power from the former to the latter, there is employed a supporting bracket 24 of leather, or other flexible and nonconductive material, which is secured to and projects laterally from the lever 14, said bracket carrying upon its outer end a contact disk 25, preferably of carbon, which is mounted to rotate upon a bolt or pin 26 supported in the end of said bracket. To said contact disk is connected one of the wires 7 of the motor circuit including the generator 27. The other wire 6 of the motor circuit is connected to a carbon contact disk 28 which is rotatably mounted on a pin or bolt 29 supported in a bracket 30 depending from the bench or table 31 on which the mechanism is mounted and insulated, as shown at 32, therefrom. The contact disks 25 and 26 form the switch in the motor circuit and when they are in contact, as shown in Fig. 1, current from the generator is passed through the motor to revolve the shaft 2. Attached to the arm 21 of the controlling lever and to the under side of the table 31 is a coiled spring 33 whose tension is exerted to swing said lever on its fulcrum and normally hold the disks 25 and 28 separated, as shown in Fig. 5, to open the motor circuit so that there shall be no consumption of current except at such time as the motor is being employed to operate a machine.

To provide for closing the motor circuit upon the initial movement of the lever 14 when actuated to carry the friction wheel 8 into contact with the friction wheel 11, contact disks 25 and 28 are arranged such distance apart as to cause the disk 25 carried by the lever to make contact with the disk 28, before said lever 14 shall have moved far enough to cause a frictional engagement with the wheels 8 and 11. By means of this arrangement the first result of depressing the pedal 23 will be to close the motor circuit and cause a rotation of the shaft 2 and the wheel 8 thereon. A further depression of the pedal will slide the shaft 2 longitudinally through the operation of the lever 14 and carry the wheel 8 on said shaft into frictional engagement with the wheel 11, thereby rotating said wheel and its shaft 10 in unison with the motor shaft. As the initial movement of the lever 14 through a depression of the pedal is sufficient to carry the contact disks into engagement, it is necessary to provide for a further movement of said lever to shift longitudinally the shaft 2 after effecting a contact between said disks. The flexible bracket 24 of leather or other like material enables said result to be accomplished by reason of the fact that when the lever 14 is moved farther to the right after the disk 25 has been carried into contact with the disk 28, the bracket 24 will buckle, as shown in Fig. 7, thereby permitting of a movement of said lever within certain limits without affecting the contact between said disks, an arrangement which permits of a manipulation of the lever 14 after the circuit is closed to cause a frictional engagement or a disengagement of the wheels 8 and 11 without interruption to the motor circuit, always insuring the rotation of the wheel 8 by the motor through a primary closing of the motor circuit before said wheel is carried into contact with the wheel 11 and allowing the motor circuit to still remain closed after the wheel 8 shall have been allowed to move away from the wheel 11 sufficiently to disengage it therefrom, enabling the machine to be stopped, when desired, without necessarily stopping the motor.

A brake is provided for the wheel 11 to enable it and its shaft 10 to be stopped quickly as is often necessary when operating a sewing machine, by extending from the lever 14 a laterally projecting and inwardly curved arm 34 whose inner forked end 35 lies adjacent the side of the wheel 11 near its rim and which is provided with inwardly projecting lugs 36 of suitable friction material which normally stand slightly away from the wheel 11 but which are carried forcibly against said wheel when the lever 14 is released sufficiently to allow of a disconnection of the driving wheel 8 therefrom. The tension of the spring 33 is sufficient to carry the friction lugs quickly and forcibly into contact with the wheel 11, thereby instantly arresting the rotation of said wheel upon the disengagement therefrom of the wheel 8. The movement of the lever 14 necessary to apply the brake to the wheel 11 is sufficient to carry the disk 25 from contact with the disk 28, thereby opening the motor circuit.

In order to enable a proper adjustment of the motor with its shaft and friction wheel 8, and its controlling lever with respect to the driven wheel 11, the base 17 of said motor is provided with a rigid jaw member 37 (see Fig. 2) which extends under the bench 31 and carries the thumb screw 38 adapted to be screwed against the under face of the bench to securely lock the motor in position when properly adjusted. This mode of fastening the motor to the bench enables it to be accurately adjusted thereon so as to establish a proper working relation between its parts and the relatively fixed wheel 11 driven thereby. This manner of detachably mounting the motor also enables it to be removed and readily set up at some other place, should it be desired to change the location thereof.

Variable speeds may be attained in the driven shaft 10 by varying the frictional contact between the wheels 8 and 11. A slight contact only between said wheels when the motor is turning at full speed will drive the shaft 10 at a relatively low speed which may be increased by gradually increasing the frictional contact between said wheels until full contact is afforded, at which time the shafts 2 and 10 will turn at the same speed. When all downward pressure is removed from the pedal 23, the spring 33 will actuate the lever 14 to carry the disk 25 away from the disk 28 to open the motor circuit, at the same time causing the brake to engage the wheel 11 and arrest the rotation thereof.

Having thus fully set forth our invention, what we claim as new and desire to secure by Letters Patent, is:—

1. A power transmission mechanism, comprising an electric motor and its shaft, said shaft being longitudinally movable in its bearings, a driving member fixed on the motor shaft, a relatively stationary driven member in axial alinement with the driving member and adapted to be frictionally engaged thereby, said motor being adjustable with respect to said driven member to regulate the space between the driving and driven members when out of contact, a lever for moving the motor shaft longitudinally to carry the driving member thereon into frictional contact with said driven member, a circuit including a source of electric energy connected with the motor, a switch in said circuit, one part of said switch connected to said lever to effect an opening and closing of the motor circuit as said lever is actuated.

2. Power transmission mechanism, comprising an electric motor, an electric circuit therefor including a source of electric energy and a circuit opening and closing switch, a driving member on the motor shaft, a rotatable driven member in axial alinement therewith, said driving member being movable into contact with said driven member, a lever engaging said driving member for moving it into contact with said driven member, a brake carried upon said lever adapted to engage the driven member when the driving member is out of engagement therewith, one of the members of the switch being mounted on said lever to effect an opening and closing of the switch as the lever is actuated, and a pedal connected with said lever.

3. Power transmission mechanism, comprising an electric motor, an electric circuit therefor including a source of electric energy and a circuit opening and closing switch, a rotatable member to be driven disposed in axial alinement with the motor shaft, a rotary driving member connected to the motor shaft and movable into frictional engagement with said driven member, means for actuating said driving member to carry it into engagement with the driven member, said means being operatively associated with said switch to close the motor circuit in advance of the frictional engagement between the driving and driven members.

4. Power transmission mechanism, comprising an electric motor, a motor circuit including a source of electric energy and a circuit opening and closing switch, a rotatable member to be driven disposed in axial alinement with the motor shaft, a rotatable driving member mounted on the motor shaft and movable into frictional contact with said driven member, means for carrying said driving member into frictional engagement with the driven member and operatively associated with said switch to close the motor circuit in advance of the frictional engagement between said members, said means being actuatable to vary the frictional engagement between said driving and driven members without affecting said switch after the initial operation of closing it.

5. Power transmission mechanism, comprising an electric motor, a motor circuit including a source of electric energy and a circuit opening and closing switch, a rotatable member to be driven, a rotatable driving member operated by the motor and movable into contact with said driven member, a lever for actuating said driving member to carry it into frictional driving relation with the driven member, one part of said switch connected to said lever to effect an opening and closing of the motor circuit as said lever is actuated, a brake also carried by said lever adapted to be carried into engagement with the driven member by a movement of said lever which allows a disconnection of the driven and driving members, and a pedal connected with said lever.

In testimony whereof, we sign this specification in the presence of two witnesses.

MAXIMILIAN K. GOLDEN.
WILLIAM H. KENDALL.

Witnesses:
O. B. BAENZIGER,
I. G. HOWLETT.